(12) United States Patent
Tang et al.

(10) Patent No.: US 10,700,781 B2
(45) Date of Patent: Jun. 30, 2020

(54) TRANSCEIVER WITH REDUCED FILTER INSERTION LOSS AND METHODS OF MAKING AND USING THE SAME

(71) Applicant: Source Photonics (Chengdu) Co. Ltd., Chengdu (CN)

(72) Inventors: Xiaohui Tang, Chengdu (CN); Jian Yang, West Hills, CA (US); Yong Zhang, Chengdu (CN)

(73) Assignee: Source Photonics (Chengdu) Co., Ltd., Chengdu (CN)

( * ) Notice: Subject to any disclaimer, the term of this patent is extended or adjusted under 35 U.S.C. 154(b) by 3 days.

(21) Appl. No.: 15/514,823

(22) PCT Filed: Mar. 16, 2017

(86) PCT No.: PCT/CN2017/076941
§ 371 (c)(1),
(2) Date: Mar. 27, 2017

(65) Prior Publication Data
US 2018/0269971 A1 Sep. 20, 2018

(51) Int. Cl.
*H04B 10/40* (2013.01)
*H04B 10/112* (2013.01)
(Continued)

(52) U.S. Cl.
CPC ....... *H04B 10/1125* (2013.01); *G02B 6/4206* (2013.01); *G02B 27/1006* (2013.01); *H04B 10/40* (2013.01); *H04B 10/691* (2013.01)

(58) Field of Classification Search
CPC .................................................. H04B 10/40
See application file for complete search history.

(56) References Cited

U.S. PATENT DOCUMENTS 6,353,491 B1 * 3/2002 Tanaka ............... H04B 10/40
257/81
9,164,247 B2 10/2015 Amit
(Continued)

FOREIGN PATENT DOCUMENTS

CN 1654996 A 8/2005
CN 102723996 A 10/2012
(Continued)

OTHER PUBLICATIONS

International Search Report and Written Opinion; International Searching Authority/CN dated Dec. 8, 2017; International Application No. PCT/CN2017/077427; 8 pgs.; International Searching Authority/State Intellectual Property Office of the P.R. China; Beijing, China.

(Continued)

*Primary Examiner* — Nathan M Cors
(74) *Attorney, Agent, or Firm* — Andrew D. Fortney; Central California IP Group, P.C.

(57) ABSTRACT

A bidirectional optical subassembly, an optical transceiver including the same, and methods of making and using the same are disclosed. The optical subassembly includes a photodiode configured to receive an incoming optical signal, a transmitter configured to transmit an outgoing optical signal, and a passive optical signal processing unit including a filter and a mirror. The filter is at a first predetermined angle relative to an optical path of the outgoing optical signal and is configured to (i) reflect one of the outgoing optical signal and the incoming optical signal and (ii) allow the other of the outgoing optical signal and the incoming optical signal to pass through. The mirror is configured to reflect the one of the outgoing optical signal and the incoming optical signal at a second predetermined angle. The first
(Continued)

predetermined angle is adapted to reduce filter insertion losses.

18 Claims, 6 Drawing Sheets

(51) Int. Cl.
*G02B 27/10* (2006.01)
*G02B 6/42* (2006.01)
*H04B 10/69* (2013.01)

(56) References Cited

U.S. PATENT DOCUMENTS

| | | | |
|---|---|---|---|
| 9,568,680 B1* | 2/2017 | Amit | G02B 6/4206 |
| 2005/0019037 A1 | 1/2005 | Luo et al. | |
| 2005/0180755 A1 | 8/2005 | Masahiko | |
| 2012/0213527 A1* | 8/2012 | Duijn | G02B 6/4246 |
| | | | 398/139 |
| 2013/0028611 A1* | 1/2013 | Amit | G02B 6/4201 |
| | | | 398/152 |
| 2015/0349889 A1* | 12/2015 | Jung | H04B 10/40 |
| | | | 398/139 |
| 2016/0308622 A1* | 10/2016 | Pfnuer | G02B 6/2938 |

FOREIGN PATENT DOCUMENTS

| | | |
|---|---|---|
| CN | 105278036 A | 1/2016 |
| JP | 2005116867 A | 4/2005 |
| WO | 2017161519 A1 | 9/2017 |

OTHER PUBLICATIONS

Zeng Tongxin; "Single Fiber Bi-Directional Optical Component, Optical Module and Optical Network Device"; Bibliographic Data of CN102723996 (A); Oct. 10, 2012; http://worldwide.espacenet.com.

Masahiko Tsumori; "Bi-Directional Optical Transceiver Module"; Bibliographic Data of CN1654996 (A); Aug. 17, 2005; http://worldwide.espacenet.com.

Sun Feilong et. al.; "Optical Module"; Bibliographic Data of CN105278036 (A); Jan. 27, 2016; http://worldwide.espacenet.com.

* cited by examiner

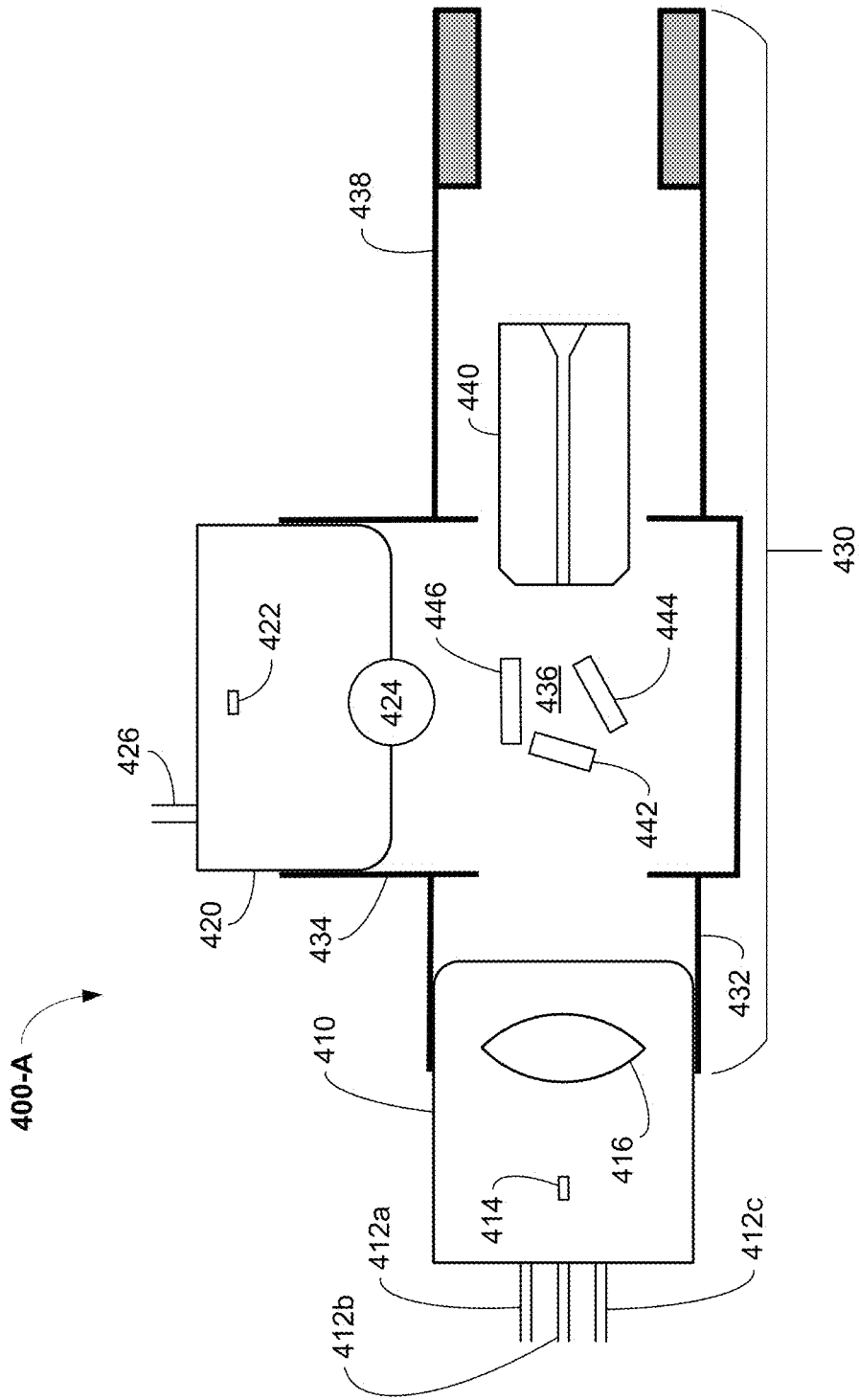

US 10,700,781 B2

TRANSCEIVER WITH REDUCED FILTER INSERTION LOSS AND METHODS OF MAKING AND USING THE SAME

FIELD OF THE INVENTION

The present invention relates to the field of optical communications, especially to optical subassemblies for optical and/or optoelectronic transceivers and methods of making and using the same. More specifically, embodiments of the present invention pertain to methods and apparatuses for reducing power loss due to one or more filters in the optical path of an optical signal.

DISCUSSION OF THE BACKGROUND

In optical communications, optical signals carry information. For example, a transmitter (e.g., a laser or laser diode) in an optical or optoelectronic transceiver converts one or more electrical signals into optical signals, and a receiver (e.g., a photodiode) in an optical or optoelectronic transceiver converts one or more optical signals into electrical signals. One objective of optical communication research and development is to increase and/or maximize bandwidth (e.g., the amount of information transmitted) to the greatest extent possible. Another objective is to communicate the information with as few errors or losses as possible.

In a number of conventional designs, the optics in an optical or optoelectronic transceiver includes a filter at a 45° angle relative to the incoming optical signal and a photodetector at a 90° angle relative to the incoming optical signal. The filter reflects the incoming optical signal towards the photodetector. FIG. 1 shows such a conventional optical receiver 100, including a lens 110, a mirror 120, a filter 130, and a receiver 140. As shown, lens 110 receives an optical signal IN (e.g., from an optical fiber) and provides a focused optical signal 150 to the mirror 120. The mirror 120 then reflects the optical signal 150 to the receiver 140 in the form of a reflected optical signal 155 for further processing. The reflected optical signal 155 may pass through the filter 130 before being received in the receiver 140. The reflected optical signal 155 may be partially or fully polarized (e.g., having electric field vectors in planes at certain angles with reduced amplitudes).

In a bidirectional optical transceiver, the mirror 120 is replaced with a filter (e.g., a wavelength selective filter). In such a case, the filter in the path of the optical signal may cause a significant loss in received signal power (e.g., filter insertion loss). Increasing the power of the received optical signal 150 at the source can exceed the specifications of other components in an optical system (such as an optical network) including the bidirectional optical transceiver.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

The present invention is intended to overcome one or more deficiencies in the prior art, and provide a bidirectional optical subassembly (BOSA) for an optical and/or optoelectronic transceiver and methods of making and using the same. The present optical subassembly changes the positions and angles of certain components to reduce or minimize filter insertion loss.

The optical subassembly includes a photodetector configured convert an incoming optical signal to an incoming electrical signal, a laser diode configured to convert an outgoing electrical signal to an outgoing optical signal, and a passive optical signal processing unit. The passive optical signal processing unit comprises a filter and a mirror. The filter is at a first predetermined angle relative to an optical path of the outgoing optical signal, and is configured to (i) reflect one of the outgoing optical signal and the incoming optical signal and (ii) allow the other of the outgoing optical signal and the incoming optical signal to pass through. The first predetermined angle is adapted to reduce or minimize filter insertion loss relative to the first filter being at an angle of 45° relative to the outgoing optical signal. The mirror is configured to reflect the one of the outgoing optical signal and the incoming optical signal at a second predetermined angle. The mirror may be a total reflectance mirror.

In a further embodiment, the filter and the mirror reflect the incoming optical signal, and the second predetermined angle is from 100° to 160° with respect to the reflected incoming optical signal. In other embodiments, the optical subassembly further comprises a fiber adapter or connector configured to receive an optical fiber, and a first fiber stub in the fiber adapter or connector configured to receive or hold the optical fiber or an end thereof. The optical fiber carries both the incoming optical signal and the outgoing optical signal. Alternatively, the fiber adapter may include an angled physical contact (APC) fiber stub configured to receive or hold the optical fiber or an end thereof.

In other or further embodiments, the optical subassembly may further comprise (i) an optical isolator between the laser diode and the passive optical signal processing unit, configured to rotate the outgoing optical signal by a predetermined amount in a predetermined direction, (ii) one or more amplifiers (e.g., a transimpedance amplifier and/or a limiting amplifier) configured to amplify the electrical signal from the photodiode, (iii) a first lens between the laser diode and the passive optical signal processing unit configured to focus the outgoing optical signal onto an optical signal transmission medium, (iv) a second lens between the photodetector and the passive optical signal processing unit configured to focus the incoming optical signal onto the photodetector, and/or (v) a second filter between the passive optical signal processing unit and the photodetector configured to filter the incoming optical signal.

In a some embodiments, the first predetermined angle may be from 10° to 30° (e.g., 14° to 25°, or any angle or range of angles therein) with respect to a plane that is orthogonal to the optical axis of the outgoing optical signal, and the second predetermined angle may be from 10° to 40° (e.g., 23° to 33°, or any angle or range of angles therein) with respect to the optical axis of the outgoing optical signal or the plane that is orthogonal to the optical axis of the outgoing optical signal.

Another aspect of the present invention relates to a method of processing optical signals, comprising reflecting one of an incoming optical signal and an outgoing optical signal using a first filter at a first angle adapted to reduce or minimize filter insertion loss relative to the first filter at an angle of 45°, reflecting the one of the incoming optical signal and an outgoing optical signal using a mirror at a second angle, passing the other of the incoming optical signal and the outgoing optical signal through the first filter, converting the incoming optical signal to an incoming electrical signal using a photodetector in an optical path of the incoming optical signal from the first filter or the mirror, and converting an outgoing electrical signal to the outgoing optical signal and emitting the outgoing optical signal toward the first filter or the mirror using a laser diode. As for the optical subassembly, the mirror may be a total reflectance mirror.

In a further embodiment, the method of processing optical signals comprises reflecting the incoming optical signal with the first filter, then reflecting the incoming optical signal with the mirror. In such an embodiment, the second angle may be from 100° to 160° with respect to the reflected incoming optical signal. In other embodiments, the method of processing optical signals comprises receiving the incoming optical signal from an optical fiber in a fiber adapter or connector, and transmitting the outgoing optical signal through the optical fiber. As for the optical subassembly, the optical fiber or an end thereof may be held or secured with a fiber stub (which may be an APC fiber stub) in the fiber adapter. The fiber adapter may be cylindrical.

In other or further embodiments, the method of processing optical signals may further comprise (i) passing the outgoing optical signal through an optical isolator between the laser diode and the passive optical signal processing unit, the optical isolator being configured to rotate the outgoing optical signal by a predetermined amount in a predetermined direction, (ii) focusing the outgoing optical signal onto an optical signal transmission medium using a first lens, (iii) focusing the incoming optical signal onto the photodetector using a second lens, and/or (iv) filtering the incoming optical signal with a second filter between the passive optical signal processing unit and the photodetector.

In some embodiments, the first angle may be from 10° to 30° (e.g., 14° to 25°, or any angle or range of angles therein) with respect to a plane that is orthogonal to the optical axis of the outgoing optical signal and the second angle may be from 10° to 40° (e.g., 23° to 33°, or any angle or range of angles therein) with respect to the optical axis of the outgoing optical signal or the plane that is orthogonal to the optical axis of the outgoing optical signal.

Yet another aspect of the present invention relates to a method of making an optical subassembly, comprising placing a photodetector in a first location in or on an optical housing, placing a laser diode in a second location in or on the optical housing, and forming a passive optical signal processing unit in the optical housing by a process comprising mounting or affixing a first filter on a first surface of the optical housing at a first predetermined angle relative to an optical path of the outgoing optical signal, and mounting or affixing a mirror on a second surface of the optical housing. The photodetector is configured to receive an incoming optical signal, and the laser diode is configured to emit an outgoing optical signal. The first filter is configured to (i) reflect one of the outgoing optical signal and the incoming optical signal and (ii) allow the other of the outgoing optical signal and the incoming optical signal to pass through, and the first predetermined angle is adapted to reduce or minimize filter insertion loss relative to the first filter at an angle of 45° relative to the outgoing optical signal. The mirror is configured to reflect the one of the outgoing optical signal and the incoming optical signal at a second predetermined angle.

In a further embodiment of the method of making an optical subassembly, the first filter reflects the incoming optical signal, and the mirror reflects the reflected incoming optical signal. In such an embodiment, the second predetermined angle may be from 100° to 160° with respect to the incoming optical signal. In other embodiments, the method of making an optical subassembly may further comprise connecting, attaching or securing a fiber adapter or connector on or to the optical housing, placing a first fiber stub in the fiber adapter, and placing or securing an optical fiber (or an end thereof) in the first fiber stub. Alternatively, the method may further comprise placing an angled physical contact (APC) fiber stub in the fiber adapter, and placing or securing the optical fiber (or an end thereof) in the APC fiber stub.

In other or further embodiments, the method of making an optical subassembly may further comprise (i) mounting or affixing an optical isolator on a third surface of the optical housing between the laser diode and the passive optical signal processing unit configured to rotate the outgoing optical signal by a predetermined amount in a predetermined direction, (ii) mounting or affixing a first lens on the optical housing between the laser diode and the passive optical signal processing unit configured to focus the outgoing optical signal onto an optical signal transmission medium, (iii) mounting or affixing a second lens on the optical housing between the passive optical signal processing unit and the photodetector configured to focus the incoming optical signal onto the photodetector, and/or (iv) mounting or affixing a second filter on a fourth surface of the optical housing between the photodiode and the passive optical signal processing unit, the second filter being configured to filter the incoming optical signal.

In some embodiments, the first predetermined angle may be from 10° to 30° (e.g., 14° to 25°, or any angle or range of angles therein) with respect to a plane that is orthogonal to the optical axis of the outgoing optical signal, and the second predetermined angle may be from 10° to 40° (e.g., 23° to 33°, or any angle or range of angles therein) with respect to the optical axis of the outgoing optical signal or the plane that is orthogonal to the optical axis of the outgoing optical signal.

The present optical subassembly reduces filter insertion loss in an optical or optoelectronic transceiver relative to the same filter in the same transceiver at an angle of 45° (e.g., as shown in the receiver of FIG. 1). These and other advantages of the present invention will become readily apparent from the detailed description of various embodiments below.

BRIEF DESCRIPTION OF THE DRAWINGS

FIGS. 5A-B are diagrams showing exemplary optoelectronic transceivers and/or modules in accordance with embodiments of the present invention.

DETAILED DESCRIPTION

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components and circuits have not been described in detail so as not to unnecessarily obscure aspects of the disclosure.

In the context of this application, the terms "signal" and "optical signal" refer to any known structure, construction, arrangement, technique, method and/or process for physically transferring data or information from one point to another. Also, unless indicated otherwise from the context of its use herein, the terms "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

For the sake of convenience and simplicity, the terms "optical" and "optoelectronic" are generally used interchangeably herein, and use of either of these terms also includes the other, unless the context clearly indicates otherwise, but these terms are generally given their art-recognized meanings herein. Furthermore, the term "transceiver" refers to a device having at least one receiver and at least one transmitter, and use of the term "transceiver" also includes the individual terms "receiver" and/or "transmitter," unless the context clearly indicates otherwise.

Various embodiments and/or examples disclosed herein may be combined with other embodiments and/or examples, as long as such a combination is not explicitly disclosed herein as being unfavorable, undesirable or disadvantageous. The invention, in its various aspects, will be explained in greater detail below with regard to exemplary embodiments.

The present invention advantageously reduces filter insertion loss in an optical transceiver or a bidirectional optical assembly (BOSA). Placing the filter at an angle less than 45° (e.g., 10°-25°) with respect to a plane orthogonal to the outgoing optical signal may decrease filter insertion loss.

Figure 2:
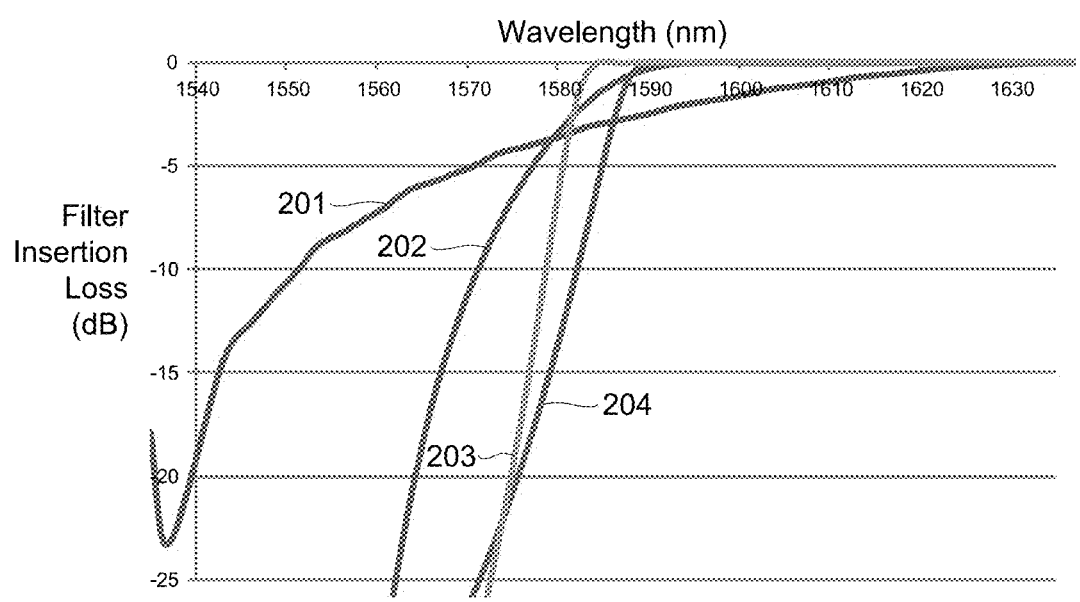
FIG. 2 is a graph depicting insertion loss as a function of wavelength for different filter angles and different light beam characteristics.

FIG. 2 shows a graph depicting insertion loss as a function of wavelength for different angles of an optical filter and different light beam characteristics. The filter is configured to transmit light having a wavelength of 1610 nm or greater and block light having a wavelength less than or equal to 1550 nm.

Line 201 is a spectral curve for light having a half beam angle of 8°, with the filter at an angle of incidence of 45°. As is shown by line 201, an appreciable amount of light at or below 1550 nm passes through the filter, and the filter is not completely transparent to light at 1610 nm or higher.

Line 202 is a spectral curve for light having a half beam angle of 8°, with the filter at an angle of incidence of 17°. When placed at an angle of 17°, the filter is completely transparent to light at 1610 nm or longer, and substantially completely opaque to light at 1550 nm or shorter. In fact, if a light source providing light at 1610 nm or 1550 nm drifts slightly (e.g., by up to about 10 nm), the filter at 17° retains its transparency and opaqueness properties with respect to such light. In general, when an incoming optical signal is not parallel (as in the case of an optical signal passing through a lens on one side of the filter and having a focal point on the other side of the filter), the 17° filter shows better performance and less insertion losses than the 45° filter.

Line 203 is a spectral curve for light having a parallel beam with the filter at an angle of incidence of 17°. Line 204 is a spectral curve for light having a parallel beam with the filter at an angle of incidence of 45°. Although line 204 shows that the filter at an angle of 45° has acceptable performance for a parallel light beam, the line 203 shows that the filter at an angle of 17° is transparent over a greater range of wavelengths and opaque over a greater range of wavelengths than the 45° filter. Thus, the 17° filter shows better performance and less insertion losses than the filter at 45°.

The filter angles represented by lines 202 and 203 have less insertion losses over the wavelength range of 1540-1630 nm than the same filter at an angle of incidence of 45°. The results in FIG. 2 also show that a filter at an angle of incidence in the range of 10°-25° may provide beneficial results, and that filters having other light-filtering (e.g., transparency and opaqueness) properties can benefit from a change in the angle from the conventional 45°.

A First Exemplary Optical Signal Assembly

Figure 3:
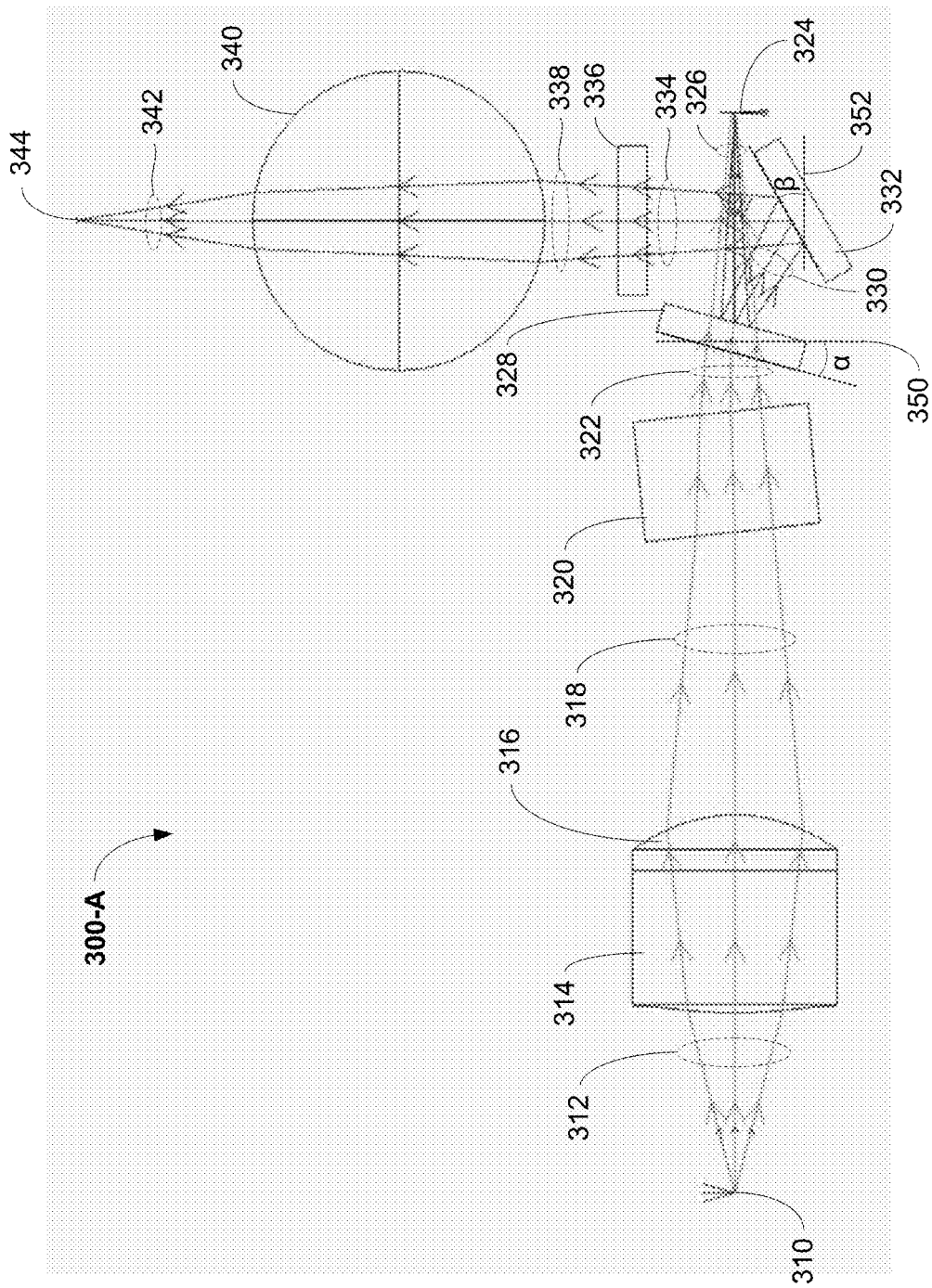
FIG. 3 shows a first exemplary arrangement of components for an optical subassembly in accordance with one or more embodiments of the present invention.

FIG. 3 is a diagram illustrating a first exemplary optical subassembly 300-A (e.g., within an optical transceiver) according to one or more embodiments of the present invention. As shown, optical subassembly 300-A comprises an optical transmitter 310, a lens holder 314, a first lens 316, an isolator 320, a first filter 328, a mirror 332, a second filter 336, a second lens 340, and an optical receiver 344. The optical transmitter 310 may comprise a laser or laser diode, such as a heterostructure lasers (e.g., a double heterostructure laser, a separate confinement heterostructure laser, etc.), a quantum well laser, a quantum cascade laser, an interband cascade laser, a distributed Bragg reflector laser, a distributed feedback laser, a vertical cavity laser (e.g., a vertical-cavity surface-emitting laser [VCSEL], a vertical-external-cavity surface-emitting laser [VECSEL], etc.), an external-cavity diode laser, or other device that converts an electrical current into light. The optical receiver 344 may comprise a photodetector, such as a photodiode (e.g., a PN junction photodiode, a PIN junction photodiode, an avalanche photodiode, etc.) or other device that converts light into an electric current. The filter 328 and mirror 332 may constitute a passive optical signal processing unit, optionally along with one or more of the filter 336, the isolator 320, the lens 316 and the lens 340.

The lens 316 focuses an outgoing optical signal 312 (which may be collimated) from the transmitter 310 onto an optical signal medium transmission 324. In one embodiment, the outgoing optical signal 312 is a diffuse beam, and the lens 316 may partially or completely collimate the outgoing optical signal 312. As shown, the lens 316 is integral with the lens holder 314. Alternatively, the lens 316 may be a separate unit, held in place by the lens holder 314. The focused outgoing optical signal 318 passes through the isolator 320 to rotate the focused outgoing optical signal 318 by a predetermined amount in a predetermined direction. For example, the isolator 320 may be configured to rotate the focused outgoing optical signal 318 by 45°, in either a clockwise or counterclockwise direction. Isolator 320 may also be positioned at an angle of from 5° to 15° with respect to a plane 350 that is orthogonal to the axis of the focused optical signal 318. The isolated outgoing optical signal 322 then passes through the filter 328 and enters the optical signal transmission medium 324 for transmission to a network.

A separate incoming optical signal 326 is received from an optical signal medium transmission 324 (e.g., a fiber optic cable or other optical fiber). The incoming optical signal 326 has a wavelength or wavelength band that can be received and processed by the receiver 344. The first filter 328 has a surface that reflects the incoming optical signal 326 towards the mirror 332. In the example 300-A shown in FIG. 3, the first filter 328 reflects all or substantially all of the incoming optical signal 326. In various embodiments, the first filter 328 is a dichroic mirror or other beam splitter (e.g., a long wave pass [LWP] dichroic mirror, short wave pass [SWP] dichroic mirror, etc.). In alternative embodiments, the first filter 328 is a wavelength selective filter (e.g., made of or coated with a material that reflects or is transparent to light having a certain wavelength or wavelength band), a polarization filter (e.g., configured to increase the degree of polarization of the optical signal), an amplitude modulation mask, a phase modulation mask, a hologram and/or a grating.

Figure 1:
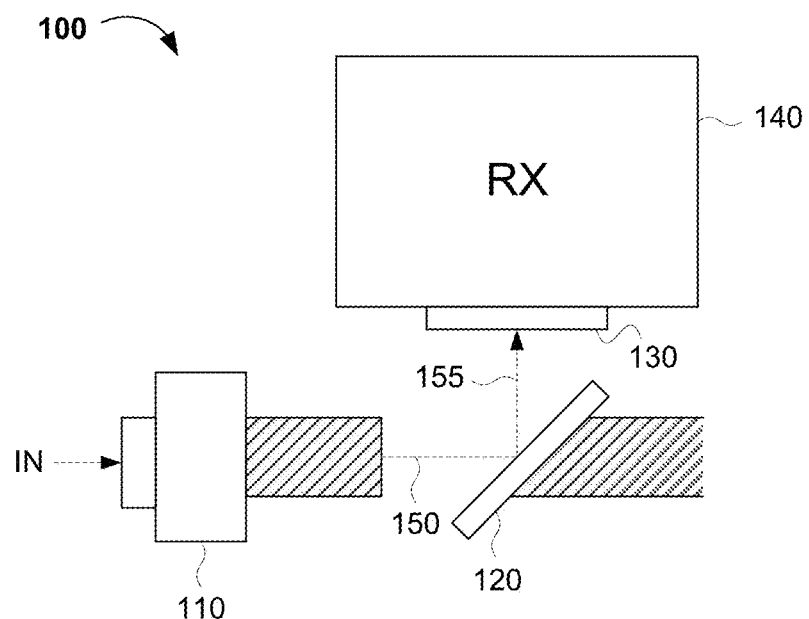
FIG. 1 is a diagram showing a conventional optical subassembly for an optical receiver.

As shown, the first filter 328 is positioned at a first predetermined angle α with respect to the plane 350 (i.e., that is orthogonal to the axis of the outgoing optical signal 312). The angle α is configured to reduce insertion loss of the reflected optical signal 330 relative to the same filter positioned at a 45° angle with respect to the axis of outgoing optical signal 312 (e.g., α=45°, as shown in FIG. 1). For example, α may be 17°±x°, where x=10 or any positive number less than 10. Alternatively, the isolated outgoing optical signal 322 and the incoming optical signal 326 may have an angle of incidence of about 17° on the first filter 328. In the example shown in FIG. 3, the first filter 328 is at an angle α of exactly 17° with respect to the plane 350.

The reflected incoming optical signal 330 is further reflected by the mirror 332 toward the receiver 344 or the second filter 336. The mirror 332 is configured to reflect all or substantially all of the reflected incoming optical signal 330. The mirror 332 is positioned at a second predetermined angle β (e.g., from about 15° to about 60°) with respect to a plane 352 that is parallel with the axis of outgoing optical signal 312. For example, the mirror 332 may be at an angle β of 28°±y°, where y=15 (or any positive number less than 15) with respect to the plane 352 that is parallel to the axis of outgoing optical signal 312. In one embodiment, the second angle β is exactly 28°.

In addition, depending on the relative positions and orientations of the optical signal transmission medium 324, the second lens 340 and the receiver 344, the sum of (i) the angle of incidence of incoming optical signal 326 on the first filter 328 and (ii) the angle of incidence of the reflected incoming optical signal 330 on the mirror 332 may be from about 30° to about 75°. More particularly, the sum of the angles of incidence of light on the first filter 328 and mirror 332 may be, e.g., 45°±z°, where z=15 or any positive number less than 15. Alternatively, the sum of the first and the second predetermined angles (α+β) may be about 45°. In the embodiment shown in FIG. 3, α+β is exactly 45°.

Prior to impinging on the receiver 344, the reflected incoming optical signal passes through the filter 336 (e.g., a bandpass filter) and the lens 340. The filter 336 is generally configured to narrow or reduce a wavelength band of the reflected incoming optical signal 334 (e.g., allow wavelengths of light within a relatively narrow band to pass through, while blocking other wavelengths of light). Alternatively, the filter 336 can be placed elsewhere along the optical path of the incoming optical signal (e.g., between the first filter 328 and the mirror 332, between the second lens 340 and the receiver 344, etc.). The lens 340 focuses the filtered incoming optical signal 338 onto the receiver 344. The lens 340 as shown is a ball lens, but may also comprise a half-ball lens, a concave lens, a convex lens and/or a combination of concave and convex lenses.

The optical receiver 344 can comprise a photodiode (e.g., a PN junction photodiode, a PIN junction photodiode, or an avalanche photodiode, etc.) or any other device configured to convert an optical signal into an electrical signal. In one embodiment, the optical receiver 344 comprises (i) a photodiode configured to receive an optical signal and convert the optical signal into an electrical signal, and (ii) circuitry in electrical communication with the photodiode (e.g., a transimpedence amplifier and/or a limiting amplifier) configured to process (e.g., amplify) the converted electrical signal.

In an alternative embodiment, the paths of the optical signals from the transmitter 310 and the receiver 344 may be effectively exchanged. For example, the outgoing optical signal 312 may be emitted by transmitter 310 toward the mirror 322, and the incoming optical signal 342 may pass though the filter 328 prior to being focused by the lens 340 and impinging on the receiver 344. The positions of the lens 316 with lens holder 314 and the lens 340 may be effectively exchanged, so that the lens 316 and the lens holder 314 are between the transmitter 310 and the mirror 332, and the lens 340 is between the receiver 344 and the first filter 328. Additionally, the isolator 320 may be placed between the transmitter 310 and the mirror 332, and the second filter 336 may be placed between the first filter 328 and the receiver 344.

The exemplary optical assembly 300-A advantageously reduces or minimizes the filter insertion loss of optical signals (e.g., the reflected incoming optical signal 330 and/or the isolated outgoing optical signal 322), thereby maximizing the intensity or power of the optical signal. By utilizing a filter (e.g., first filter 328) positioned at an angle less than that of conventional optics, and "folding" the reflected light beam in a direction other than towards the light-receiving unit, the optical signal can be provided to an optoelectronic receiver and/or transceiver with minimal filter insertion loss, thereby maximizing the power and/or intensity of the optical signal.

A Second Exemplary Optical Signal Assembly

Figure 4:
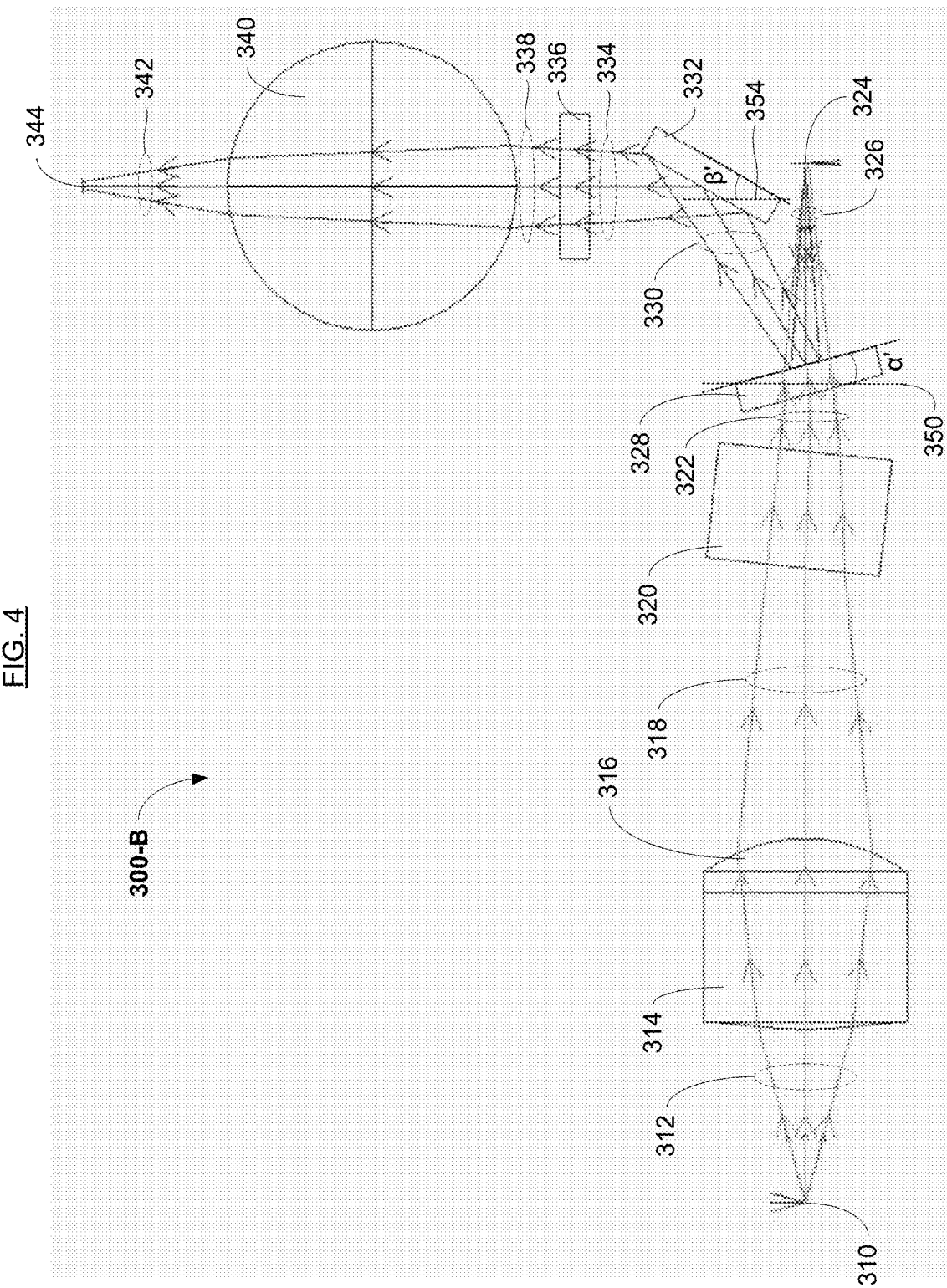
FIG. 4 shows a second exemplary arrangement of components for an optical subassembly in accordance with one or more embodiments of the present invention.

FIG. 4 illustrates a second exemplary optical subassembly 300-B (e.g., within an optical transceiver) according to one or more embodiments of the present invention. As shown, the optical subassembly 300-B contains the same components as the optical subassembly 300-A of FIG. 3, but with different positions and/or angles of the filter 328 and the mirror 332. For example, the angle of incidence α' of the isolated outgoing optical signal 322 on the filter 328 may have the same range of values as the angle α in the optical subassembly 300-A, but may have an opposite sign (e.g., −17°±x°, where x=10 or any number less than 10). Effectively, the filter 328 may be rotated in the opposite direction from that shown in FIG. 3 with respect to the plane 350.

In addition, the mirror 332 may be placed between the optical path of the incoming optical signal (and/or the isolated outgoing optical signal) 326 and the receiver 344. For example, the angle of the mirror 332 may be 100° to 160° with respect to the reflected incoming optical signal 330. Alternatively, the mirror 332 may be at an angle β' with respect to a plane 354 that is parallel with the plane 350. The angle β' is adapted to direct or reflect the reflected incoming optical signal 330 towards the receiver 344 (e.g., through the lens 340). For example, the angle β' may be 28°±y°, where y=15 (or any positive number less than 15) with respect to the plane 354. In one embodiment, the angle β' is exactly 28°.

Similar to the exemplary optical assembly 300-A, the exemplary optical assembly 300-B advantageously reduces or minimizes the insertion loss of the filter 328 on the optical signals (e.g., the incoming optical signal 326 and/or the isolated outgoing optical signal 322), thereby maximizing the intensity or power of the optical signals. By utilizing a filter (e.g., the first filter 328) positioned at an angle less than that of conventional passive optical components, and "folding" the reflected light beam in a direction other than towards the light-receiving unit, the optical signals can be provided (e.g., the incoming optical signal 326 to an optoelectronic receiver and/or the outgoing optical signal 322 to the optical signal transmission medium 324) with minimal filter insertion loss, thereby maximizing the power and/or intensity of the optical signals.

A First Exemplary Optical Transceiver

FIG. 5A is a diagram of an optical transceiver 400-A that includes components similar to or the same as those of the optical assembly 300-A in FIG. 3, where the passive optical signal processing unit (e.g., filter 442 and mirror 444) is oriented similarly to the passive optical signal processing unit of optical assembly 300-A of FIG. 3. The optical transceiver 400-A includes a transmitter optical subassembly (TOSA) 410 with a transmitter (e.g., laser diode) 414 and a first lens 416 secured therein, a receiver optical subassembly (ROSA) 420 with a receiver (including a photodetector such as a photodiode) 422 and a second lens 424 secured therein, and a housing 430 including a TOSA sleeve or connector 432, a ROSA sleeve or connector 434, an optical cavity or cavities 436 and a fiber adapter or sleeve 438 including a fiber stub 440 therein.

The optical cavity or cavities 436 provide surfaces on which components of the passive optical signal processing unit, including a first filter 442, a mirror 444, and a second filter 446, are secured or mounted. Optical transceiver 400-A further comprises a plurality of electrical leads 412a, 412b and 412c to transmitter circuitry within TOSA 410 and one or more sleeves (not shown) to adjust a position of the TOSA 410 or ROSA 420. TOSA 410 may further comprise a window in the wall between the lens 416 and the first filter 442, and an adapter or sleeve (not shown) enabling adjustment of the distance between the transmitter 414 and the lens 416 (e.g., to optimize the focal length of the lens 416). The optical housing 430 is further configured to house and protect the passive optical signal processing unit. The ROSA 420 is adapted to hold the lens 424 and shield and/or protect the photodetector 422. The ROSA 420 may further include one or more electrical leads 426 to and/or from the circuitry in the ROSA 420.

The optical transceiver 400-A may further comprise an optical isolator (not shown) with magnets on opposed sides thereof, between the TOSA 410 and the first filter 442. The fiber adapter or sleeve 438 may include a fiber connector (not shown) configured to secure an optical fiber to the optical transceiver 400-A. The fiber stub 440 holds an end of the optical fiber from the fiber connector in place in the optical cavity 436. In some embodiments, the fiber stub 440 comprises an angled physical contact (APC) fiber stub (see, e.g., FIG. 6).

The lens 416 is secured in an opening in the TOSA 410 and focuses light (e.g., an outgoing optical signal) from the transmitter 414. The outgoing optical signal may be focused onto the end of the optical fiber adjusting the distance between the transmitter 414 and the lens 416. The incoming optical signal from the optical fiber may be focused onto the photodetector 422 by adjusting a position of (e.g., sliding) the ROSA 420 in the ROSA sleeve or connector 434.

The passive optical signal processing unit (e.g., the filter 442, the mirror 444, and the second filter 446) of the optical transceiver 400-A are mounted onto or affixed to surfaces on or in the optical cavity 436 before the optical fiber (including fiber stub 440), the TOSA 410 and the ROSA 420 are connected. For example, the first filter 442, the mirror 444 and the second (e.g., bandpass) filter 446 may be mounted or affixed to surfaces of the optical cavity 436 (or on surfaces in separate cavities in the optical housing 430 that opens to a sleeve or connector 432, 434 or 438) by applying a thin adhesive layer to each of the filter 442, mirror 444 and filter 446 (or a peripheral region thereof) and inserting the filter 442, mirror 444 and filter 446 into optical cavity 436 (e.g., through one of the sleeves or connectors 432, 434 or 438). Afterwards, the TOSA 410, the ROSA 420 and the fiber adapter or connector are inserted into respective sleeves or connectors 432, 434 and 438 to connect them to the optical housing 420 and seal the filter 442, the mirror 444 and the filter 446 from external light. In some embodiments, the optical transceiver 400-A comprises a cavity open to the surface or wall of the housing 430 opposite from the ROSA 420 (e.g., the bottom surface or wall of the housing 430) through which one or more of the passive optical components can be inserted and mounted in the housing 430, and a cap (not shown) configured to seal the cavity in the optical housing 420.

An Alternative Exemplary Optical Transceiver

Figure 5B:
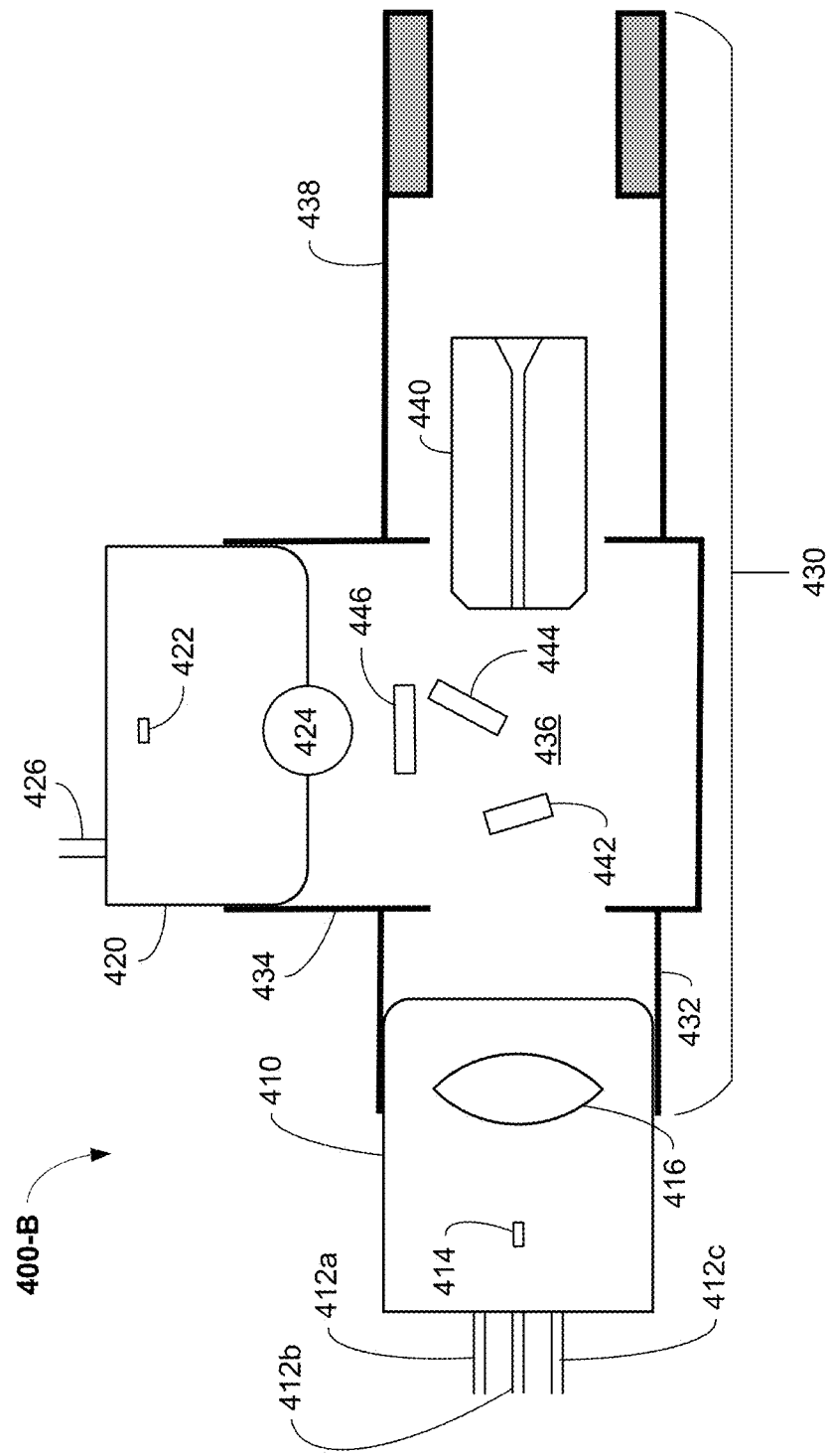

FIG. 5B is a diagram of an optical transceiver 400-B that includes the same or similar components as the optical transceiver 400-A in FIG. 5A, but where the passive optical signal processing unit (e.g., filter 442 and mirror 444) is oriented similarly to optical assembly 300-B of FIG. 4. The optical cavity 436 can have a form or design similar to that in the optical transceiver 400-A in FIG. 5A (e.g., separate cavities with an opening to the outside of the optical housing and/or to an adapter or connector for the transmitter, receiver or optical fiber; one central cavity with an opening to the outside of the optical housing or to the optical fiber adapter or connector into which the filter 442, the mirror 444, and second filter 446 are inserted prior to mounting or affixing; etc.).

An Exemplary APC Fiber Stub

Figure 6:
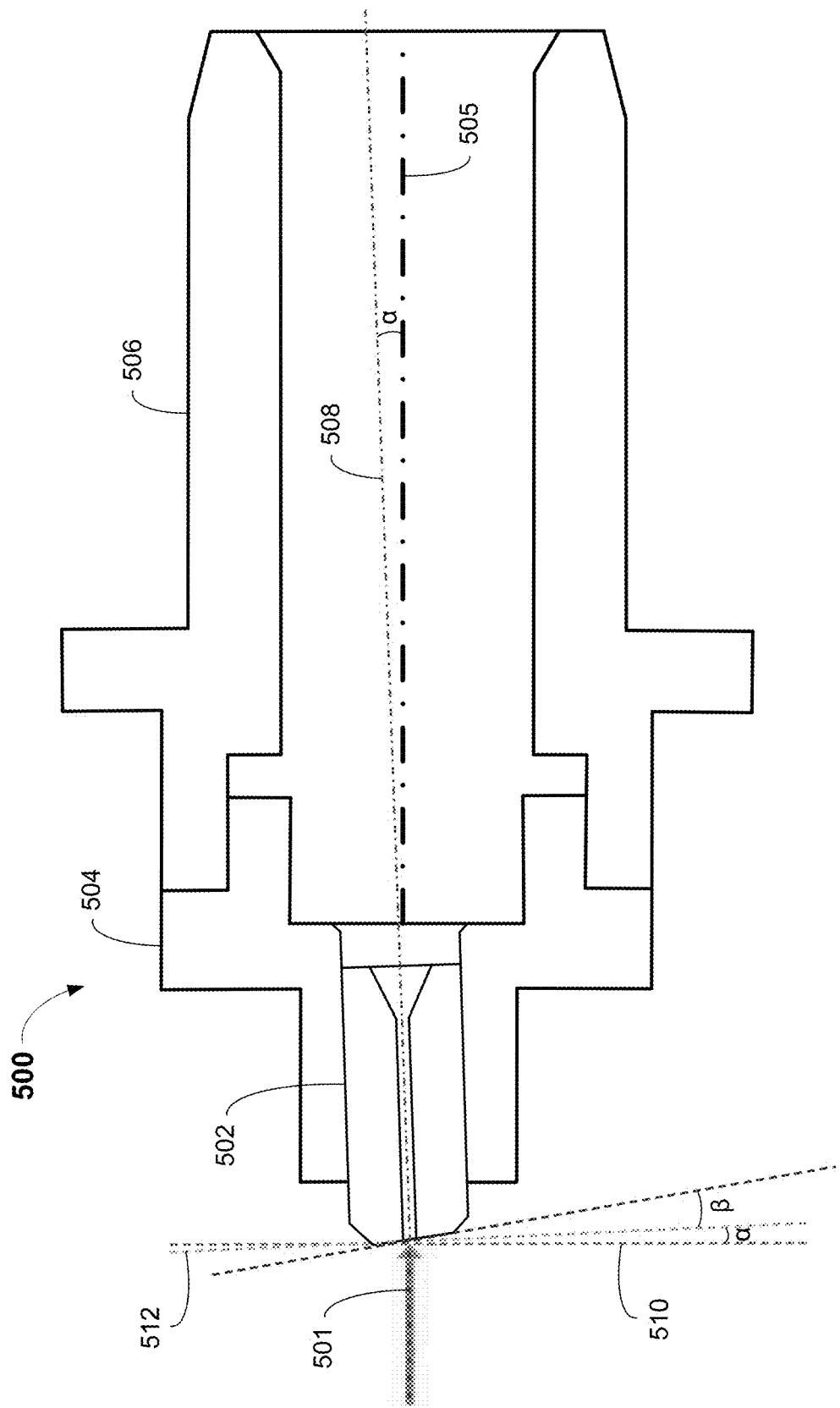
FIG. 6 is a diagram showing an exemplary fiber connector in accordance with one or more embodiments of the present invention.

FIG. 6 is a diagram showing an exemplary fiber adapter assembly 500. The fiber adapter assembly 500 includes an APC fiber stub 502 in a connector 504, and an optical transmission medium (e.g., an optical fiber) in a fiber adapter 506. The optical transmission medium provides an incoming optical signal 505 to an optical subassembly (not shown), and receives an outgoing optical signal 501. Since the refractive index of air is different from the refractive index of the optical fiber (e.g., silica glass), the path of the outgoing optical signal 501 leaving the optical subassembly (which may include air) and entering the optical fiber may be undesirably refracted in the optical fiber.

The fiber adapter assembly 500 of FIG. 6 may facilitate straightening the optical path of the outgoing optical signal

501 without adversely affecting the incoming optical signal 505 by orienting the central axis of the APC fiber stub 502 at an angle α relative to a plane 510 normal to the outgoing optical signal 501. The incoming optical signal 505 is originally aligned with a horizontal optical axis when passing through the fiber in the fiber adapter 506. Without the angled APC fiber stub 502, the outgoing optical signal 501 may be undesirably aligned with the slanted optical axis 508 (e.g., as a result of the outgoing optical signal 501 passing through elements of the optical subassembly).

Furthermore, the surface of APC fiber stub 502 facing the optical subassembly may be at an additional angle β relative to the plane 510 to advantageously increase the characteristic return loss of any incoming optical signal that reflects back into the optical fiber medium. For example, when the APC fiber has an end face without a filter coating, for any incoming optical signal 505, if the angle β increases, the optical signal return loss will also increase. The plane 512 between the angles α and β is normal (i.e., perpendicular) to the axis of the optical transmission medium in the APC fiber stub 502.

If $N_0$ is the refractive index of the air inside the optical cavity (e.g., outside the APC fiber stub 502), and $N_1$ is the refractive index of the core of the optical fiber medium, the outgoing optical signal 501 is aligned with a horizontal optical axis (e.g., the axis of the optical fiber in the fiber adapter 506) when the following equation [1] is satisfied:

$$N_0 * \sin(\alpha + \beta) = N_1 * \sin(\beta) \quad [1]$$

For example, if $N_0=1$, $N_1=1.47$, and β=5°, then α should be 2.4°. In another example, if $N_0=1$, $N_1=1.47$, and β=8°, then α should be 3.7°.

CONCLUSION/SUMMARY

Embodiments of the present invention advantageously provide an optical subassembly, an optical receiver, transceiver and module including the same, and methods for making and using such an optical subassembly. The present optical subassembly reduces filter insertion losses in the optical signals in an optical or optoelectronic transceiver relative to the prior art.

The foregoing descriptions of specific embodiments of the present invention have been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An optical subassembly, comprising:
a photodetector configured to convert an incoming optical signal to an incoming electrical signal;
a laser diode configured to convert an outgoing electrical signal to an outgoing optical signal;
a passive optical signal processing unit, comprising:
a first filter configured to (i) reflect one of the outgoing optical signal and the incoming optical signal and (ii) allow the other of the outgoing optical signal and the incoming optical signal to pass through, wherein the other of the outgoing optical signal and the incoming optical signal has a first angle of incidence of 14° to 25° on the first filter, and the first filter at the first angle has a smaller insertion loss than an identical filter at an angle of incidence of 45° to the other of the outgoing optical signal and the incoming optical signal; and
a mirror configured to reflect the one of the outgoing optical signal and the incoming optical signal, wherein the mirror is (i) at a second angle of 13° to 43° with respect to a plane that is parallel with the optical path of the other of the outgoing optical signal and the incoming optical signal and (ii) on an opposite side of the optical path of the other of the outgoing optical signal and the incoming optical signal from (a) the photodiode when the one of the outgoing optical signal and the incoming optical signal is the incoming optical signal and (b) the laser diode when the one of the outgoing optical signal and the incoming optical signal is the outgoing optical signal,
wherein when the one of the outgoing optical signal and the incoming optical signal is the incoming optical signal, the filter reflects the incoming optical signal away from the photodiode, and when the one of the outgoing optical signal and the incoming optical signal is the outgoing optical signal, the mirror reflects the outgoing optical signal towards the photodiode; and
an angled physical contact (APC) fiber stub configured to provide the incoming optical signal to the optical subassembly, receive the outgoing optical signal from the optical subassembly, and straighten the optical path of the outgoing optical signal without adversely affecting the incoming optical signal, the APC fiber stub having a central axis at an angle relative to a plane normal to the outgoing optical signal of from 2.4° to 3.7°.

2. The optical subassembly of claim 1, wherein the first filter and the mirror reflect the incoming optical signal, and a sum of (i) the angle of incidence of the other of the outgoing optical signal and the incoming optical signal on the filter and ii) an angle of incidence of the other of the outgoing optical signal and the incoming optical signal on the mirror is from 30° to 60°.

3. The optical subassembly of claim 1, further comprising a fiber adapter or connector configured to receive an optical fiber, wherein the optical fiber carrying the incoming optical signal and the outgoing optical signal and the APC fiber stub is in the fiber adapter or connector.

4. The optical subassembly of claim 3, wherein the APC fiber stub is configured to receive or hold an end of the optical fiber.

5. The optical subassembly of claim 1, further comprising an optical isolator between the laser diode and the passive optical signal processing unit, the optical isolator configured to rotate the outgoing optical signal by a predetermined amount in a predetermined direction.

6. The optical subassembly of claim 1, further comprising (i) a first lens between the laser diode and the passive optical signal processing unit, configured to focus the outgoing optical signal onto an optical signal transmission medium, and (ii) a second lens between the photodetector and the passive optical signal processing unit configured to focus the incoming optical signal onto the photodetector.

7. The optical subassembly of claim 1, wherein the mirror is a total reflectance mirror.

8. The optical subassembly of claim 1, wherein the APC fiber stub has a surface facing the passive optical signal processing unit at an additional angle of from 5° to 8° relative to the plane normal to the outgoing optical signal.

9. A method of processing optical signals, comprising:
reflecting one of an incoming optical signal and an outgoing optical signal using a first filter at a first angle;
passing the other of the incoming optical signal and the outgoing optical signal through the first filter, wherein the other of the outgoing optical signal and the incoming optical signal has a first angle of incidence of 14° to 25° on the first filter, and the first filter at the first angle of incidence has a smaller insertion loss than an identical filter at an angle of incidence of 45° relative to the other of the outgoing optical signal and the incoming optical signal;
reflecting the one of the incoming optical signal and an outgoing optical signal using a mirror at a second angle of 13° to 43° with respect to a plane that is parallel with the optical path of the other of the outgoing optical signal and the incoming optical signal;
converting the incoming optical signal to an incoming electrical signal using a photodetector in an optical path of the incoming optical signal from (i) the first filter when the one of the outgoing optical signal and the incoming optical signal is the outgoing optical signal or (ii) the mirror when the one of the outgoing optical signal and the incoming optical signal is the incoming optical signal;
converting an outgoing electrical signal to the outgoing optical signal and emitting the outgoing optical signal toward the first filter or the mirror using a laser diode, wherein:
when the one of the outgoing optical signal and the incoming optical signal is the incoming optical signal, the filter reflects the incoming optical signal away from the photodiode, and when the one of the outgoing optical signal and the incoming optical signal is the outgoing optical signal, the mirror reflects the outgoing optical signal towards the photodiode, and
the mirror is on an opposite side of the optical path of the other of the outgoing optical signal and the incoming optical signal from (a) the photodiode when the one of the outgoing optical signal and the incoming optical signal is the incoming optical signal and (b) the laser diode when the one of the outgoing optical signal and the incoming optical signal is the outgoing optical signal; and
straightening the optical path of the outgoing optical signal using an angled physical contact (APC) fiber stub configured to provide the incoming optical signal to the optical subassembly and receive the outgoing optical signal from the optical subassembly, without adversely affecting the incoming optical signal, the APC fiber stub having a central axis at an angle relative to a plane normal to the outgoing optical signal of from 2.4° to 3.7°.

10. The method of claim 9, comprising reflecting the incoming optical signal with the first filter and the mirror, wherein a sum of (i) the angle of incidence of the other of the outgoing optical signal and the incoming optical signal on the first filter and (ii) an angle of incidence of the other of the outgoing optical signal and the incoming optical signal on the mirror is from 30° to 60.

11. The method of claim 9, further comprising receiving the incoming optical signal from an optical fiber in a fiber adapter or connector, transmitting the outgoing optical signal through the optical fiber, and holding or securing an end of the optical fiber with the APC fiber stub in the fiber adapter or connector.

12. The method of claim 9, further comprising passing the outgoing optical signal through an optical isolator.

13. The method of claim 9, further comprising focusing the outgoing optical signal onto an optical signal transmission medium using a first lens and focusing the incoming optical signal onto the photodetector using a second lens.

14. The method of claim 9, wherein the APC fiber stub has a surface facing the passive optical signal processing unit at an additional angle of from 5° to 8° relative to the plane normal to the outgoing optical signal.

15. A method of making an optical subassembly, comprising:
placing a photodetector in a first location in or on an optical housing, the photodetector being configured to receive an incoming optical signal;
placing a laser diode in a second location in or on the optical housing, the laser diode being configured to emit an outgoing optical signal;
forming a passive optical signal processing unit in the optical housing by a process comprising:
mounting or affixing a first filter on a first surface of the optical housing at a first predetermined angle, wherein the first filter is configured to (i) reflect one of the outgoing optical signal and the incoming optical signal and (ii) allow the other of the outgoing optical signal and the incoming optical signal to pass through, the other of the outgoing optical signal and the incoming optical signal has a first angle of incidence of 14° to 25° on the first filter, and the first filter at the first angle of incidence has a smaller insertion loss than an identical filter at an angle of incidence of 45° relative to the other of the outgoing optical signal and the incoming optical signal; and
mounting or affixing a mirror on a second surface of the optical housing configured to reflect the one of the outgoing optical signal and the incoming optical signal, wherein the mirror is (i) at a second angle of 13° to 43° with respect to a plane that is parallel with the optical path of the other of the outgoing optical signal and the incoming optical signal and (ii) on an opposite side of the optical path of the other of the outgoing optical signal and the incoming optical signal from (a) the photodiode when the one of the outgoing optical signal and the incoming optical signal is the incoming optical signal and (b) the laser diode when the one of the outgoing optical signal and the incoming optical signal is the outgoing optical signal; and
placing an angled physical contact (APC) fiber stub in a fiber adapter and connector, the APC fiber stub being configured to provide the incoming optical signal to the optical subassembly, receive the outgoing optical signal from the optical subassembly, and straighten the optical path of the outgoing optical signal without adversely affecting the incoming optical signal, the APC fiber stub having a central axis at an angle relative to a plane normal to the outgoing optical signal of from 2.4° to 3.7°,
wherein when the one of the outgoing optical signal and the incoming optical signal is the incoming optical signal, the filter reflects the incoming optical signal away from the photodiode, and when the one of the outgoing optical signal and the incoming optical signal is the outgoing optical signal, the mirror reflects the outgoing optical signal towards the photodiode.

16. The method of claim 15, further comprising connecting, attaching or securing the fiber adapter or connector on or to the optical housing, and placing or securing an optical fiber in the APC fiber stub.

17. The method of claim 15, further comprising (i) mounting or affixing a first lens on the optical housing between the laser diode and the passive optical signal processing unit configured to focus the outgoing optical signal onto an optical signal transmission medium, and (ii) mounting or affixing a second lens on the optical housing between the passive optical signal processing unit and the photodetector configured to focus the incoming optical signal.

18. The method of claim 15, wherein the APC fiber stub has a surface facing the passive optical signal processing unit at an additional angle of from 5° to 8° relative to the plane normal to the outgoing optical signal.

* * * * *